US011148981B1

(12) United States Patent
Pearce (10) Patent No.: US 11,148,981 B1
(45) Date of Patent: Oct. 19, 2021

(54) BIOLOGICALLY ACTIVE COMPOST (71) Applicant: Sym Soil, Inc., Los Altos, CA (US)

(72) Inventor: Elizabeth Pearce, Santa Rosa, CA (US)

(73) Assignee: SymSoil, Fairfield, CA (US)

( * ) Notice: Subject to any disclaimer, the term of this patent is extended or adjusted under 35 U.S.C. 154(b) by 64 days.

(21) Appl. No.: 16/233,060

(22) Filed: Dec. 26, 2018

Related U.S. Application Data

(60) Provisional application No. 62/611,531, filed on Dec. 28, 2017.

(51) Int. Cl.
*C05F 11/08* (2006.01)
*C05F 5/00* (2006.01)
*C05F 17/60* (2020.01)

(52) U.S. Cl.
CPC .............. *C05F 11/08* (2013.01); *C05F 5/002* (2013.01); *C05F 17/60* (2020.01)

(58) Field of Classification Search
CPC .......... C05F 11/00; C05F 17/60; C05F 5/002; C05F 17/00; C05F 11/08
See application file for complete search history.

(56) References Cited

U.S. PATENT DOCUMENTS

| RE22,202 E | 10/1942 | Stoller |
| 2,820,703 A | 1/1958 | Dresser et al. |
| 2,928,210 A | 5/1960 | Cirillo et al. |
| 3,364,007 A | 1/1968 | Redman |
| 3,451,799 A | 6/1969 | Brown |
| 3,934,999 A | 1/1976 | Meier |
| 3,963,470 A * | 6/1976 | Haug ............ C05F 17/40 71/9 |
| 4,263,744 A | 4/1981 | Stoller |
| 4,420,320 A | 12/1983 | Hartmann et al. |
| 4,565,552 A | 1/1986 | Cotton |

(Continued)

FOREIGN PATENT DOCUMENTS

JP    2002338380 A  * 11/2002
WO   WO2009042622     4/2009

OTHER PUBLICATIONS

Stiborova, Hana, et al. "Bacterial community structure in treated sewage sludge with mesophilic and thermophilic anaerobic digestion." Folia microbiologica 60.6 (2015): 531-539.*

(Continued)

*Primary Examiner* — Jennifer A Smith (57) ABSTRACT

A biologically active compost is manufactured using a sterile commodity compost, a set of cultures and inoculants, and a disbursed portion of an earlier biologically active compost. The biologically active compost is manufactured from the sterile commodity compost, infusing it with the cultures and inoculants, and combining it with the disbursed portion of an earlier biologically active compost. The resultant biologically active compost includes a compost substrate suitable for growing biological material, and a microbiome permeating the substrate, the microbiome having a collection of microfauna with a wide biological diversity or other statistical variance. The microbiome includes archaea, aerobic or anaerobic bacteria, amoebae or protozoa, fungi, nematodes, microarthopods, or plant or animal fragments, well in excess of amounts that can survive the thermophilic process for producing the commodity compost.

12 Claims, 1 Drawing Sheet (56) References Cited

U.S. PATENT DOCUMENTS

| | | | |
|---|---|---|---|
| 4,846,870 | A | 7/1989 | Weltzien et al. |
| 5,009,697 | A | 4/1991 | Martin et al. |
| 5,014,462 | A | 5/1991 | Malmgren et al. |
| 5,171,690 | A | 12/1992 | Ylosjoki |
| 5,351,643 | A | 10/1994 | Hughes |
| 5,457,031 | A | 10/1995 | Masse |
| 5,524,423 | A | 6/1996 | Haley |
| 5,584,905 | A | 12/1996 | Wilson |
| 6,281,001 | B1 | 8/2001 | McNelly |
| 6,560,920 | B1 | 5/2003 | Serkiz et al. |
| 6,582,637 | B1 | 6/2003 | Phinney |
| 6,649,740 | B1 | 11/2003 | Smith et al. |
| 7,091,036 | B2 | 8/2006 | Rostrom |
| 7,642,090 | B2 | 1/2010 | O'Neill et al. |
| 7,741,466 | B2 | 6/2010 | Brown et al. |
| 8,025,027 | B1 | 9/2011 | Morales-Ramos et al. |
| 8,034,148 | B2 | 10/2011 | Tyler |
| 8,129,177 | B2 | 3/2012 | Cohn |
| 8,197,834 | B2 | 6/2012 | Rodriguez-Kabana et al. |
| 2001/0029762 | A1 | 10/2001 | Steele et al. |
| 2002/0174697 | A1 | 11/2002 | Reid et al. |
| 2003/0008036 | A1 | 1/2003 | Huige et al. |
| 2006/0112749 | A1 | 6/2006 | Noll et al. |
| 2008/0064087 | A1 | 3/2008 | O'Neill et al. |
| 2009/0145188 | A1 | 6/2009 | Moya |
| 2012/0184022 | A1 | 7/2012 | Power |
| 2012/0187041 | A1 | 7/2012 | Popa et al. |
| 2013/0167602 | A1 | 7/2013 | Blake |
| 2016/0073577 | A1 | 3/2016 | Schutt |
| 2017/0283337 | A1* | 10/2017 | Gaunt ............. C05B 17/00 |

OTHER PUBLICATIONS

Christian, Archer H., Gregory K. Evanylo, and James W. Pease. "On-Farm Composting: A Guide to Principles, Planning & Operations." (2009).*

Sunday Gardener. "Practical Tips for Your Garden" How to Make and Use Leaf Mold <https://www.sundaygardener.net/how-to-make-and-use-leaf-mold/> Nov. 14, 2016 (Year: 2016).*

Dr. Beth Mason, Production of high value protein feeds and fertilizer from pre-consumer vegetable waste utilizing a novel black soldier fly larvae conversion process, Verschuren Center for Sustainability in Energy & Environment, Cape Breton University.

* cited by examiner

BIOLOGICALLY ACTIVE COMPOST

INCORPORATED DISCLOSURES

Priority Claim. This Application describes technologies that can be used with inventions, and other technologies, described in one or more of the following documents. This application claims priority, to the fullest extent permitted by law, of these documents.

This application claims priority of

U.S. Provisional Application 62/611,531, filed Dec. 28, 2017, naming inventor Elizabeth PEARCE, titled "Manufacturing Biologically Active Compost, Sequentially and Simultaneously Cultivating Multiple Types of Indigenous Microorganisms", currently pending, hereby incorporated by reference as if fully set forth herein.

Related Documents. This Application also claims priority of, and incorporates by reference Technical Appendix 1 (unpublished) having 2 pages, titled "Compost Product Process", a copy of which is enclosed herewith, hereby incorporated by reference as if fully set forth herein;

Technical Appendix 2 (unpublished) having 7 pages, titled "Example Compost Batch Species", a copy of which is enclosed herewith, hereby incorporated by reference as if fully set forth herein;

Technical Appendix 3 (unpublished) having 8 pages, titled "Compost Production Process", a copy of which is enclosed herewith, hereby incorporated by reference as if fully set forth herein;

Technical Appendix 4 (unpublished) having 8 pages, titled "Processes, Products, and Methods", a copy of which is enclosed herewith, hereby incorporated by reference as if fully set forth herein.

The Related Documents include at least portions describing a process, a set of products, and a set of acceptable (but not exclusive) bacterial and fungal species, one or more of which is intended to be incorporated in the "robust compost", as further described herein.

Each of these documents is hereby incorporated by reference as if fully set forth herein. Techniques described in this Application can be elaborated with detail found therein. These documents are sometimes referred to herein as the "Incorporated Disclosures," "Incorporated Documents," or variants thereof.

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Field of the Disclosure. This Application generally describes techniques relating to biologically active compost, including manufacturing biologically active compost and sequentially and simultaneously cultivating multiple types of indigenous microorganisms.

Related Art. Composting is a process that converts organic matter, such as agricultural waste and other organic materials, such as gardening and landscaping waste products, and produces organic matter that is relatively rich in nutrients. See, e.g., Wikipedia (Compost). Known composting methods are often used for providing soil conditioner or fertilizer. While known methods for composting can generally achieve the goal of decomposing waste material and providing fertilizer, they are subject to several drawbacks.

One problem that has arisen is that known composting methods, in their attempt to remove pathogens, such as using thermophilic (relatively high-temperature) techniques, produce a product that is nearly sterile. Compost that is nearly sterile is not as desirable as healthy soil would be, and thus not as desirable as healthy soil for agricultural or other plant growth. Although conventional compost can rely on microbes from ordinary soil for agricultural business processes, this technique is subject to several drawbacks. For example, when the soil to which compost is added is lacking sufficient growing microbes, using compost does not provide the advantages that ordinary healthy soil would provide.

It is generally known that healthy soil, which has hundreds or thousands of species of microbes in a complex microbiome, is most effective at encouraging growth of agricultural products, particularly organic agricultural products. Using compost to improve the quality of agricultural soil is most effective using healthy soil, or a close equivalent. Accordingly, it would be advantageous to provide a soil substitute that more closely matches the variegated microbiome that rich soils, such as topsoil, are able to provide.

Another problem that has arisen is that compost that is nearly sterile can achieve higher temperatures than desirable, and can even spontaneously combust, possibly in response to heat from relatively rapid biological activity by a only a relatively few species of microbes. Combustion is generally deleterious to plants for which the compost is intended to fertilize, and possibly dangerous to nearby animals, equipment, and people.

One known method for producing compost that retains at least some microbiome, called the "Soil Food Wed", has been proposed by Dr. Elaine Ingham. See, e.g., www.soilfoodweb.com; greenfieldsfarm.org/courses/soil-food-web. While this method is said to provide a variegated microbiome that is substantially free of pathogens, it is also subject to several drawbacks. One such drawback is that the Soil Food Web process is inherently limited in size. Accordingly, the amount of compost the process can produce is inherently limited. With only limited volumes that can be produced, only a limited amount of agricultural land can be fertilized.

Another problem that has arisen, both with thermophilic composting and with the Soil Food Web process, is that composting is performed in a batch method, starting with compostable material and ending with finished compost, and taking up to a year from beginning to end. Even those techniques that use less time are seasonal, often being vulnerable to cold temperature. This can have the effect that compost can be made available only at selected times, not on demand. This can also have the effect that the quantity of compost that can be produced in a selected amount of time is strictly limited by volume.

Each of these issues, as well as other possible considerations, might cause difficulty in aspects of addressing the problems relating to providing biologically active compost, particularly providing biologically active compost on demand an in arbitrarily large volume using a limited amount of equipment.

SUMMARY OF THE DISCLOSURE

This summary of the disclosure is provided as a convenience to the reader, and does not limit or restrict the scope of the disclosure or the invention. This summary is intended as an introduction to more detailed description found in this Application, and as an overview of techniques explained in this Application. The described techniques have applicability in other fields and beyond the embodiments specifically reviewed in detail.

This Application describes techniques capable of providing biologically active compost on demand in an arbitrarily large volume, using a limited amount of equipment. An initial biologically active element can be harvested and infused into a substantially sterile thermophilic compost, and a microbiome allowed to grow to permeate the entire product. One or more samples of the microbiome-permeated product (sometimes referred to herein as "robust compost") can have a portion thereof continuously disbursed and used as the initial biologically active element in one or more parallel processes for making further biologically active compost. This can have the effects that

- no arbitrary volume limit is placed on amounts of biologically active compost that can be provided at a selected time, unlike a critical volume limit on individual production imposed by conventional composting methods;
- no arbitrary volume limit is placed on amounts of biologically active compost that can be provided by a limited amount of starting equipment, unlike a volume limit on production imposed by conventional batch composting methods;
- biologically active compost can be provided on demand, and without substantial volume limit, from one or more parallel manufacturing streams, unlike a time and volume limits on production imposed by conventional batch composting methods.

This Application also describes a biologically active compost. The biologically active compost can include a microbiome having a collection of microfauna with a wide diversity, or other statistical variance, of biologically active material. The microfauna can include archaea, aerobic/anaerobic bacteria, amoebae/protozoa, fungi, nematodes, microarthopods such as small insects or portions thereof, and (possibly processed) plant/animal fragments such as earthworms, or portions thereof. The biologically active compost can include hundreds or thousands of distinct species of each of bacteria, fungi, other living materials, or portions thereof.

In one embodiment, the biologically active compost can include one or more of:

- at least about 250 micrograms of bacterial biomass per gram of biologically active compost; preferably with a minimum biodiversity of about 150 independent species of bacteria; and preferably with substantially zero spirilla, spirochetes, or streptococci observable using microscopy;
- at least about 250 micrograms of fungi per gram of biologically active compost; preferably with a minimum biodiversity of about 150 independent species of fungi; preferably with a mean fungal hyphae diameter of about 2.5 microns observable using microscopy; and preferably with a minimum and preferably with less than 15 micrograms of beneficial fungi per gram of oomycete biomass; and preferably with a ratio of fungi to bacteria of about 0.8;
- at least about 10,000 actively moving protozoa (including both flagellates and amoebae) per gram of biologically active compost; preferably with a minimum biodiversity of about 25 independent species of protozoa; preferably with less than about 100 ciliates per gram of biologically active compost observable using microscopy;
- at least about 100 nematodes per gram of biologically active compost; preferably with a minimum biodiversity of about 5 independent species of nematodes; preferably predominately of species known to consume bacteria; preferably with only a small number of nematodes known to consume fungi; and preferably with substantially zero species that primarily feed on plant roots observable using microscopy;
- preferably substantially zero *E. coli* or fecal coliforms observable using laboratory testing; and preferably less than a maximum regulatory allowed amount of heavy metals in the biologically active compost observable using chemical analysis.

In one embodiment, an exemplary list of protozoa and an exemplary list of nematodes are shown in the Technical Appendix.

In one embodiment, the biologically active compost can also include substances disposed to encourage or promote growth of the microbiome, including, e.g., biochar.

In one embodiment, the biologically active compost can also be disposed with biochemical and biological components selected in response to a set of features of natural soil to which the compost is to be added. For example, flinty soils or soils with substantially distinct pH can have biologically active compost designed to match soil features, to match agricultural products to be grown in those soils, or otherwise.

BRIEF DESCRIPTION OF THE FIGURES

In the figures, like references generally indicate similar elements, although this is not strictly required.

After reading this Application, those skilled in the art would recognize that the figures are not necessarily drawn to scale for construction, nor do they necessarily specify any particular location or order of construction.

DETAILED DESCRIPTION

General Discussion

Manufacturing and Production

Figure 1:
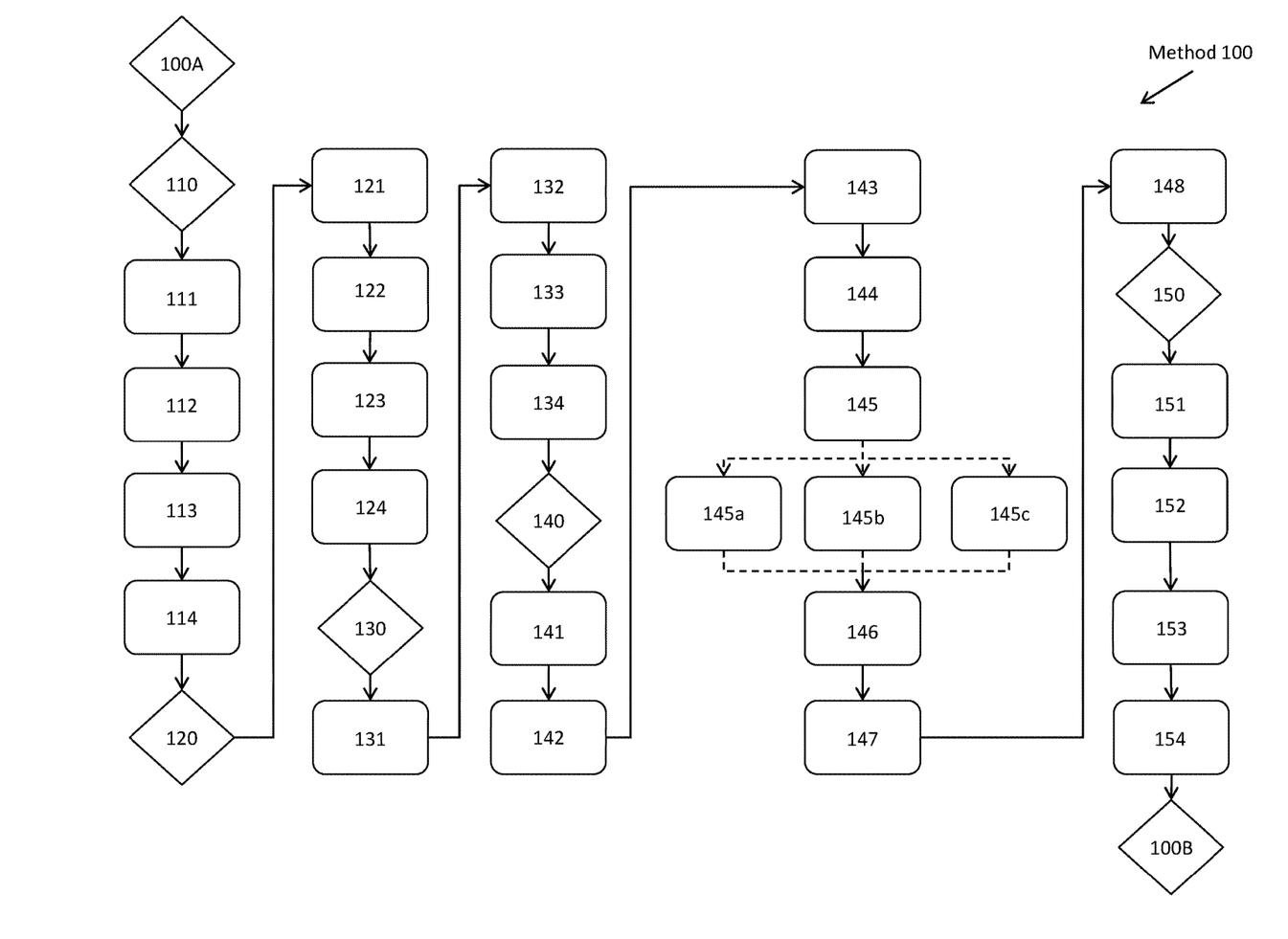
The FIGURE shows a conceptual drawing of an example method of making a biologically active compost.

In one embodiment, a biologically active compost can be manufactured using a method that includes

- a starting and continuing "robust compost", as further described herein;
- a set of materials, such as cultures and inoculants, for assisting in making a biologically active compost;
- a method of manufacturing the biologically active compost.

As further described herein, techniques for manufacturing the biologically active compost include

- starting with a commodity (or otherwise sterile) compost;
- manufacturing one or more material, such as cultures and inoculants, that can be used with production of a biologically active compost;
- modifying the commodity compost using one or more of the materials, and using one or more biological processes, to make the biologically active compost; and
- disbursing a portion of the biologically active compost to use (recursively) in one or more of the steps for modifying the commodity compost, thus using at least a portion of the biologically active compost to help make more of itself.

While this Application primarily describes techniques starting with a commodity compost, in the context of the invention, there is no particular requirement for any such limitation. For example, the techniques can be applied to an enhanced compost, such as a commodity compost that has been enhanced with a "bug in a jug" agricultural product, or an ordinary soil desired to be enhanced with at least some of the advantages of the biologically active compost, or otherwise.

As further described herein, the materials, such as cultures and inoculants, can be quite general. The particular cultures and inoculants should be considered exemplary only, and not exclusive of possible materials that might be used with the method of manufacturing the biologically active compost. Similarly, as further described herein, the process steps in the method, such as incorporating the materials, can also be quite general. The particular method steps should be considered exemplary only, and not exclusive of possible method steps that might be used with the described materials.

While this Application primarily describes techniques that distinguish between manufacturing (of the materials) and production (of the biologically active compost using the materials), in the context of the invention, there is no particular requirement for any such limitation. For example, it is possible that one or more of the materials can be manufactured in response to conditions or properties of one or more resultants of the method steps. For another example, it is possible that one or more of the materials can be manufactured in response to the biologically active compost, similar to when the biologically active compost is (recursively) disbursed to help make more of itself.

Terms and Phrases

The phrase "commodity compost", and variants thereof, generally refers to any conventional compost that can be obtained from a supplier of generally available compost, or generally available on the market without any particular customization thereof, or made by a substantially similar process. For example, a commodity compost can include any organic compost, such as a plant biomass that has been biologically decomposed using a thermophilic process. For another example, commodity compost can generally meet a legal definition of salable compost.

The phrase "thermophilic process" can include a metabolic process of microorganisms found in plant biomass, not otherwise sterilized, and kept under aerobic conditions in an ambient temperature range. For example, as further described herein, a thermophilic process can be exothermic, and can increase a biomass temperature to a selected minimum temperature, often specified by regulation, at least 140 degrees Fahrenheit and generally about 165 degrees Fahrenheit. Aerobic conditions can generally include distributing ambient air throughout the decomposing biomass, such as at least about 7% by volume, and can generally include the biomass including no more than about 80% water by mass thereof.

The phrase "compost tea", and variants thereof, generally refers to techniques, and results thereof, as described in Elaine Ingham, *Field Guide for Actively Aerated Compost Tea*, compiled and edited by Carole Rollins (2004), Sustainable Studies Inst. and Nature Technologies LLC.

The phrase "organic compost", and variants thereof, generally refers to any compost that includes any For example, an organic compost can include any plant biomass that has been biologically decomposed using a thermophilic process. One example of an organic compost (and of a commodity compost) can include, at least in the United States, compost defined in the OFPA (Organic Food Production Act of 1990) (Title 21 of the Food, Agriculture, Conservation, and Trade Act of 1990), codified at 7 U.S.C. ch. 94, § 6501 et seq. (1990). While this Application primarily describes organic compost (and sometimes describes commodity compost) as compliant with these regulations, in the context of the invention, there is no particular requirement for any such limitation. For example, it is not required that organic compost (or commodity compost) is defined as such by the OMRI (Organic Materials Review Institute) or is certified thereby any other agency having legal or regulatory jurisdiction.

The phrase "intermediate compost", and variants thereof, generally refers to any commodity compost that has not yet completed its production process.

The phrase "robust compost", and variants thereof, generally refers to any compost meeting at least one or more of:

at least about 250 micrograms of bacterial biomass per gram of biologically active compost; preferably with a minimum biodiversity of about 150 independent species of bacteria; and preferably with substantially zero spirilla, spirochetes, or streptococci observable using microscopy;

at least about 250 micrograms of fungi per gram of biologically active compost; preferably with a minimum biodiversity of about 150 independent species of fungi; preferably with a mean fungal hyphae diameter of about 2.5 microns observable using microscopy; and preferably with a minimum and preferably with less than 15 micrograms of beneficial fungi per gram of oomycete biomass; and preferably with a ratio of fungi to bacteria of about 0.8;

at least about 10,000 actively moving protozoa (including both flagellates and amoebae) per gram of biologically active compost; preferably with a minimum biodiversity of about 25 independent species of protozoa; preferably with less than about 100 ciliates per gram of biologically active compost observable using microscopy;

at least about 100 nematodes per gram of biologically active compost; preferably with a minimum biodiversity of about 5 independent species of nematodes; preferably predominately of species known to consume bacteria; preferably with only a small number of nematodes known to consume fungi; and preferably with substantially zero species that primarily feed on plant roots observable using microscopy;

preferably substantially zero *E. coli* or fecal coliforms observable using laboratory testing; and preferably less than a maximum regulatory allowed amount of heavy metals in the biologically active compost observable using chemical analysis;

otherwise meeting legal or regulatory standards for compost such as USDA standards, such as having been 15 days having a temperature between 131 degrees Fahrenheit and 170 degrees Fahrenheit and having a pile turned a minimum of about 5 times within that duration, or other equivalent standards.

The term "biochar", and variants thereof, generally refers to any charcoal suitable for use as a soil amendment, such as any carbon effective at retaining both water and watersoluble nutrients, or any carbon suitable as a habitat for beneficial soil microorganisms, or any solid material that remains after light gases and tar have been driven out or released from a carbonaceous material. See, e.g., Wikipedia (Biochar). For example, biochar can include any carbon such as produced using pyrolysis of biomass, or any high-carbon fine-grained residue of biomass such as produced using thermal decomposition of biomass in the absence of oxygen, or any remains from biomass produced using any substantial similar method. For another example, biochar can include any material meeting a standard or specification published by the International Biochar Initiative or the European Biochar Certificate issued by the European Biochar Foundation.

The term "water", and variants thereof, where ordinary water is referred to herein with respect to manufacture of robust compost, generally refers to unchlorinated water, processed to be free of microbial life, with a pH between about 6.8 and about 7.2. When water with a pH below about 7.2 is not easily available, humic acid, such as from non-organic (e.g., mineral) sources can be added to reduce the pH to within a desirable range. In one embodiment, this water can be tested periodically (weekly is preferred, but is not required) for *E. coli* and other possible pathogens.

Figures and Text

The FIGURE shows a conceptual drawing of an example method of making a biologically active compost.

As further described herein, the amounts of materials described can be appropriate for manufacture of about 100 cubic yards of robust compost. When manufacturing larger or smaller amounts of robust compost, the amounts of materials described can be adjusted proportionally, or otherwise as may be indicated.

Example Products for Use with Methods

A set of products can be used with a method of making a biologically active compost. This set of products can include, without limitation, one or more of:
  Product 1, fungal cultures;
  Product 2, biomethanation materials;
  Product 3, minerals;
  Product 4, organic materials;
  Product 5, robust compost, itself recursively used with the method of making additional robust compost;
  Product 6, indigenous microorganisms;
  Product 7, compost tea—fungal;
  Product 8, protozoa wash;
  Product 9, protozoa tea;
  Product 10, nematodes;
  or otherwise as might be appropriate for use with one or more methods of making a biologically active compost.

As further described herein, each such product can be used with the method of making biologically active compost, sometimes at more than one step in the method. In one embodiment, one or more of these products can be manufactured before, or during, a method for making robust compost.

As further described herein, robust compost itself is sometimes described as a product, or as used with manufacturing a product, that is later used to itself make robust compost. As further described herein, an initial batch of robust compost can be manufactured, such as described with respect to the method of making a biologically active compost, and portions thereof disbursed when making later batches of robust compost.

Product 1—Fungal Cultures

One product that can be used to manufacture robust compost can include a set of fungal cultures, suitable for decomposing biomass, such as in a warm, moist, and aerobic environment. In one embodiment, these microorganisms can include fungi, which can decompose lignin and cellulose.

In one embodiment, fungal cultures can include one or more of:
  (A) cultures using the oyster mushroom family (*Pleurotus* spp., such as *Pleurotus ostreatus*);
  (B) cultures using the family Strophariaceae, such as the species *Stropharia rugoso-annulata* ("King Stropharia");
  (C) cultures using the species *Trametes versicolor* ("Turkey Tail");
  (D) cultures using fungal cultures having a wide variety of microbes, such as possibly those fungal cultures retrieved from sources having a relatively large number of the microorganisms described in the Technical Appendix;
  or otherwise, such as further described herein, or such as may be appropriate with respect to manufacture of robust compost.

For each one or more of the fungal culture products "A", "B", or "C", about 10 pounds of fungal spawn is broken into pieces, each of which has a diameter of about 0.25 inches or less. The pieces are placed in a mesh bag in a compost tea brewer, as further described herein, and brewed with water that has been heated to about 70 degrees Fahrenheit. In one embodiment, the compost tea for the fungal cultures is brewed for between about 8 hours and about 30 hours, with about 18 hours being a preferred duration.

The fungal culture includes about 50 pounds of sawdust, which can be soaked for about 1 hour in a liquid product of the compost tea brewer. The soaked sawdust can be mixed with about 2 cubic yards of biochar and about 50 pounds of corn meal.

Separately, about 5 cubic yards of wood chips from two or more distinct types of trees (such as preferably oak, poplar, bay, or pine trees that have been aged more than about 6 months, or other appropriate trees that may be suitable). The wood chips can average about ⅜ inch or less in diameter. In one embodiment, they can be soaked for between about 6 to about 48 hours (with between about 18 to about 24 hours being preferred) in a liquid product of the compost tea brewer. In one embodiment, about 5 cubic yards of OMRI certified commercial compost, such as "Vision Compost", or a commodity compost made without animal waste, or a commodity compost carbon to nitrogen ratio, are preferably (but not necessarily) added to the soaked wood chips.

In one embodiment, the wood chips and any additional materials are placed in an area for oyster mushroom growth, such as inside of a hoop tent, or a bay created by stacked logs or straw bales with a covering to protect it from rain and sun. Beneath this protective covering, a pallet with an about 0.25 inch screen cover can prevent the material from sitting on the ground. The materials can be maintained containers with holes on the sides, such as a plastic fruit basket, or contained using wire mesh. This can have the effect that the materials can "breathe". In one embodiment, the materials can be left undisturbed for about two weeks or more (preferably three weeks or more) until it is used as a fungal culture.

In one embodiment, the same or a substantially similar procedure can be performed with *Stropharia rugosoannulata* (sometimes known as "King *Stropharia*") and with *Trametes versicolor* (sometimes known as "Turkey Tail"). For example, these fungal culture batches can be maintained separate from each other, not because of fear of contamination, but rather to allow cultivation to separately adjust moisture levels and optimize as needed.

In one embodiment, the wood chips can be maintained moist, with humidity in between about 40% and about 50%, such as using misting. The inventors have found that the most rapid growth is seen when the temperature is about 70 degrees Fahrenheit; accordingly, so preserving warmth at night is preferred.

A result of soaking the biochar, corn meal, and sawdust, can be mixed with a result of soaking the wood chips (with or without the OMRI certified commercial compost), such as using a compost turner. While this Application primarily describes use of all of these described materials, in the context of the invention, there is no particular requirement for any such limitation. For example, one or more of these described materials can be left out and still produce a product that promotes fungal growth.

In one embodiment, a result of this blending step is maintain in a water-tight container and soaked for about 24 hours with the liquid product of the compost tea brewer and each separate fungal culture product. A solid material produced from soaking can be buried in a composting pile, such as about 12 inches below a surface thereof. A separate result is maintained for each separate fungal culture product, so as to allow later adjustment of moisture and other possible optimization. While this Application describes particular fungal culture products, in the context of the invention, there is no particular requirement for any such limitation. For example, other fungal culture products may be used in addition or in lieu of the described fungal culture products.

Product 2—Biomethanation Materials

Another product that can be used to manufacture robust compost can include biomethanation materials, including digestates, such as solid remnants of original input material to digesters that microbes cannot use, or mineralized remains of dead bacteria from within digesters. See, e.g., Wikipedia (Digestate). Digestate can also include acidogenic digestate or methanogenic digestate.

In one embodiment, biomethanation materials, including digestates, can be extracted from techniques used to make other products described herein, such as products in which microbes operate to produce those other products.

Product 3—Minerals

Another product that can be used to manufacture robust compost can include minerals, such as those found in feldspar, or in minerals that include feldspar or mineral humic acid, such as humic acid, humate, humus, fulvic acid, and possibly other minerals. Other sources of humic acid that can be used, in addition to or in lieu of mineral humic acid, include one or more of: sub-tundra dirt, such as from Alaska and sold under a number of brand names, thus, soil that has been substantially undisturbed for hundreds or thousands of years and is now rich in nutrients; or castings from earthworms.

Other and further information about sources of humic acid include one or more of:

Stevenson F. J. (1994). *Humus Chemistry: Genesis, Composition, Reactions*. New York: John Wiley & Sons;

Ghabbour, E. A.; Davies, G. (Editors) (2001). *Humic Substances: Structures, Models and Functions*. Cambridge, U.K.: RSC publishing. ISBN 978-0-85404-811-3;

hereby incorporated by reference as if fully set forth herein.

Product 4—Organic Materials

Another product that can be used to manufacture robust compost can include one or more of:

grains (such as wheat, oat, corn, buckwheat, soybean, rice or otherwise), possibly including ground seeds, bran from the grains, cooked or raw grains, or waste products thereof or of other processes such as beer or spirits), or otherwise;

alfalfa meal, fish meal, blood meal, or otherwise;

powdered oyster shell, crab meal, crushed fish bones, or otherwise;

extract or material from succulents, such as yucca, aloe vera, agave, other succulents, or otherwise;

fruit pulp, juice, peels, pomace, or otherwise;

spent coffee grounds, used tea leaves, used yerba mata, or otherwise;

molasses, jaggery, other sugars, or otherwise;

wood fines, shredded wood, or wood chips, not to exceed about 0.50 inches in diameter, or otherwise;

or other appropriate organic materials.

Product 5—Robust Compost

Robust compost can be disbursed from an earlier portion of robust compost manufactured, as further described herein, with respect to the techniques for manufacturing robust compost. In such cases, the robust compost that is used in Product 5 (robust compost) includes one or more elements of the manufactured product later described as "robust compost".

Alternatively, Product 5 (robust compost) can have substituted, in whole or in part, a product manufactured by one or more Ingham "Soil Food Web" techniques. The Ingham "Soil Food Web" techniques are described in one or more of:

Ingham, E. R. (1999). *The Soil Biology Primer*. Chapter 1. *The Soil Foodweb*. NRCS Soil Quality Institute, USDA;

Ingham, E. R. (2004). The Soil Foodweb: Its Role in Ecosystems Health: The Overstory Book Cultivating Connections with Trees (2nd Edition); Editor Craig R. Elevitch;

Ingham, E. R. and M. D. Slaughter. (2005). *The Soil Foodweb—Soil and Composts As Living Ecosystems*. International SoilACE Conference in Soil and Compost Eco-Biology. Leon, Spain. 1: 127-139;

Wikipedia (Elaine Ingham);

Wikipedia (Soil food web).

These documents are hereby incorporated by reference as if fully set forth herein.

Product 6—Indigenous Microorganisms

Another product that can be used to manufacture robust compost can include a wide variety of microbes, such as possibly those fungal or microbial cultures retrieved from sources having a relatively large number of the microorganisms described in the Technical Appendix. In one embodiment, sources can include non-agricultural soil, such as soil from regions not used for agricultural purposes, human habitation, or human use (such as roads and trails). For example, sources can include soils from old-growth forests, or from within forests not used for human use, not used frequently for human purposes, and not subject to human treatment (such as use with fertilization, sterilization, or substantially related uses). For another example, sources can include soils from under tundra ice, or otherwise not having been cultivated or used for human use in a substantial time duration.

Product 7—Compost Tea, Fungal

Another product that can be used to manufacture robust compost can include the compost tea produced as part of the techniques used for manufacturing Product 1 (fungal cultures). One method for manufacturing compost tea is described above with respect to Product 1 (fungal cultures).

Other and further methods for manufacturing compost tea are described with respect to one or more of:

Ingham, E. R. and M. Alms. (1999), *The Compost Tea Handbook* 1.1;

Ingham, E. R. (2004), *Compost Tea Quality: Light Microscope Methods*, Soil Foodweb Inc, Corvallis, Oreg.;

Ingham, E. R. (2004) *The Field Guide for Actively Aerated Compost Tea* (AACT), Soil Foodweb Inc, Corvallis, Oreg.;

Ingham, E. R. (2005). *The Compost Tea Brewing Manual*, Edition 5, Soil Foodweb Inc, Corvallis, Oreg.;

Wikipedia (Elaine Ingham).

These documents are hereby incorporated by reference as if fully set forth herein.

Product 8—Compost Tea, Indigenous Microorganisms

Another product that can be used to manufacture robust compost can include a compost tea produced from Product 6 (indigenous microorganisms). In one embodiment, soil including a wide variety of microbes, such as possibly those fungal or microbial cultures retrieved from sources having a relatively large number of the microorganisms such as those described in the Technical Appendices, can be used in a technique for providing compost tea.

Product 9—Protozoa Wash

Another product that can be used to manufacture robust compost can include a protozoa wash.

As further described herein, the term "protozoa" generally refers to the earlier sense of the term "Protozoa", before molecular phylogenetics determined that at least some protozoa were, although similar, not necessarily closely related. Accordingly, as used herein, the term "protozoa" generally refers to any member of the earlier-defined phylum Protozoa.

As further described herein, protozoa include at least one or more of:

Amoeba, having pseudopodia or lamellipodia for locomotion, and which are generally known to consume bacteria;

Ciliates, having relatively large numbers of short hairlike organs of locomotion, or for pulling bacteria in for consumption;

*Flagellates*, also known as mastigophora, generally identified by their whiplike organelles of locomotion;

or other microorganisms earlier known as part of the phylum Protozoa.

While some protozoa consume organic matter directly from robust compost, most protozoa ingest bacteria and fungi. This can have the effect that nutrients and other chemicals needs by plants are otherwise locked up by the bacteria or fungi, and are expelled in ionic form when consumed by protozoa.

In one embodiment, the protozoa wash can be manufactured using soaking in plant leaves in water, as further described herein, for between about 12 hours and about 60 hours, with a duration of about 30-36 hours being preferred. In one embodiment, the plant leaves are collected from plants growing in areas where microscopy of soil sampling shows there are at least about 5,000 non-pathogenic protozoa per gram of soil. For example, the leaves can be farmed from nettles, hairy fava beans, ferns, equisetum ("horsetail"), comfrey, and possibly otherwise.

Product 10—Protozoa Tea

Another product that can be used to manufacture robust compost can include a protozoa tea.

As further described herein, in the phrase "protozoa tea", the term "protozoa" generally has the same or a substantially similar meaning as with respect to the Product 9 (protozoa wash), or a generally used herein for the term "protozoa".

The protozoa tea can be manufactured using compost tea made from worm castings, sometimes referred to as actively aerated compost tea or "AACT". The protozoa tea can use a fresh supply of vermi compost, determined by one or more of sampling or direct microbial observation, to have substantially significant amounts of protozoa.

This product is manufactured using unchlorinated water with a pH of about 7.0, as further described herein, starting from about 3 degrees Fahrenheit to about 5 degrees Fahrenheit above ambient temperature, with an ambient temperature between about 65 degrees Fahrenheit to about 75 degrees Fahrenheit, although other temperatures are possible.

To about 1,000 gallons of such water can be added about 5 gallons organic alfalfa meal, about 30 pounds of kelp, such as in powdered form, about 15 gallons fish hydrosate, such as in powder or liquid form, about 20 pounds of powdered humic substances (such as humic acid, fulvic acid, ulmic acid, and possibly other substantially related substances, sometimes collectively referred to herein as "humic acid" or "humic substances"). The air and water are allowed to circulate until the water reaches substantially ambient temperature.

To this mixture can be added between about 40 pounds to about 75 pounds (thus, about 10-15 gallons) of vermi compost earthworm castings, such as from Sonoma Valley Worm Farm or Terra Vesco, both of California. The earthworm castings can be placed in a porous bag in a compost tea brewer. The compost tea brewer can be used to circulate the water, while using an air coil diffuser to bubble air through the water, providing dissolved oxygen to the microbes. Protozoa should leave the vermi compost and circulate through the water.

Product 11—Nematodes

Another product that can be used to manufacture robust compost can include an infusion of nematodes.

Many entomopathogenic (insect killing and consuming) nematode species are available commercially. In one embodiment, multiple branded products of nematodes can be obtained, including at least 4 distinct nematode species, at least one or more of which is known to consume bacteria, at least one or more of which is known to consume fungi, and at least two or more of which are known to be entomopathogenic.

Although many other nematode species would be workable, and are within the scope and spirit of the invention, some preferred nematode species include one or more of: *Caenorhabditis elegans, Steinernema carpocapsae, Steinernema kraussei, Steinernema feltiae, Steinernema riobrave, Steinernema glaseri, Steinernema scarabaeid, Heterorhabditis megidis*, or *Heterorhabditis bacteriophoral.*

Although many other suppliers of nematodes would be workable, and are within the scope and spirit of the invention, some preferred suppliers of nematodes include one or more of: Applied Bionomics Ltd., ARBICO Organics, Bio-Logic Company, Beneficial Insectary, BioBest Group, Bioline AgroSciences, Koppert Biological Systems.

In one embodiment, nematodes can be blended with water at a ratio of between about 1:5 (nematodes to water) to about 1:2000. Nematodes can use moisture for movement; dilution can assist in blending nematodes into the robust compost. For example, blending can be performed using any mechanical system or pump, such as a submersible pump, that can maintain the water aerated and the solution agitated. In such cases, the suspension in the spray tank can be maintained cool and applied as soon as possible. In warm weather, ice, frozen with unchlorinated water and neutral pH can be added to maintain the temperature under about 70 degrees Fahrenheit, as nematodes can become less vigorous in warm tank water. In such cases, nematodes can be added when the temperature in the center of the robust compost is between about 50 degrees Fahrenheit and about 70 degrees Fahrenheit, with 60 degrees Fahrenheit being generally preferred.

In one embodiment, microscopic examination of nematodes can be performed to confirm active movement and life. The liquid including the nematodes can be used to drench the robust compost, such as at dusk (although other times can be acceptable when lighting, moisture, temperature, and other conditions are appropriate). Nematodes are substantially sensitive to direct sunlight, ultraviolet light, and warm temperatures, as well as to compost turning and to mechanical screening.

Alternative Products

While this Application primarily describes particular products that can be used in manufacturing robust compost, in the context of the invention, there is no particular requirement for any such limitation. For example, other and further products can be used in addition or in lieu of the described products in the context of manufacturing robust compost. Wherever one or more purposes or results of particular method flow points or method steps are described, one or more alternative products can be used when those alternative products can provide substantially equivalent purposes or results.

Example Flow Points and Method Steps

A flow point 100A indicates that the method 100 is ready to begin.

Methods of operation can include steps as described herein. While the steps are shown and described in a linear order, in the context of the invention, there is no particular requirement for any such limitation. Except where explicitly stated, there is no particular requirement for the steps to be encountered or performed linearly, or in any particular order or by any particular device. For example and without limitation, the steps can be encountered or performed in parallel, in a pipelined manner.

A method 100 includes flow points and method steps as shown in the FIGURE, and as otherwise described herein, such as:

- a flow point 100A, in which the method 100 is ready to begin;
- a flow point 110, in which the method 100 is ready to provide a modified commodity compost;
- a flow point 120, in which the method 100 is ready to test the compost material for enhancement;
- a flow point 130, in which the method 100 is ready to add inoculants to a robust compost;
- a flow point 140, in which the method 100 is ready to add a portion of a previous batch of robust compost to the intermediate compost;
- a flow point 150, in which the method 100 is ready to add further inoculants to the intermediate compost;
- a flow point 100B, in which the method 100 is ready to finish.

Beginning of Method

A flow point 100A indicates that the method 100 is ready to begin.

The method 100 can be triggered by one of more of the following:

- an alert or signal, such as when a selected amount of compostable material is available for composting;
- a designated time, such as a selected time of day, a periodic time, a random time, or otherwise;
- a passage of time, such as from a last time the method 100 was started, from the last time the method 100 was finished, or otherwise;
- a user input, such as requesting that the method 100 should be started;
- or as otherwise described herein.

The method can proceed with the next flow point.

Thermophilic Composting

A flow point 110 indicates that the method 100 is ready to provide a modified commodity compost.

At a step 111, a conventional commodity compost can be obtained from any supplier of generally available post-thermophilic commodity compost. As further described herein, a conventional commodity compost can include any compost, as further described herein, generally available on the market without any particular customization thereof. For example, compost can include any plant biomass that has been biologically decomposed using a thermophilic process. A thermophilic process can include metabolic processes of microorganisms found in plant biomass, not otherwise sterilized, and kept under aerobic conditions in an ambient temperature range.

As further described herein, the thermophilic process can be exothermic, and should increase a biomass temperature to a selected minimum temperature, often specified by regulation, at least 140 degrees Fahrenheit and generally about 165 degrees Fahrenheit. The aerobic conditions should generally include distributing ambient air throughout the decomposing biomass, such as at least about 10% by volume, and should generally include the biomass including at least about 80% by mass thereof.

As further described herein, commodity compost should generally meet a legal definition of salable compost. One such definition, at least in the United States, is defined in detail in the OFPA (Organic Food Production Act of 1990) (Title 21 of the Food, Agriculture, Conservation, and Trade Act of 1990), codified at 7 U.S.C. ch. 94, § 6501 et seq. (1990). While desirable, it is not required that the commodity compost is defined as such by the OMRI (Organic Materials Review Institute) or certified thereby any other agency having legal or regulatory jurisdiction.

As part of this step, biochar can be (optionally) added before the thermophilic process is started or before the thermophilic process is completed. For example, the biochar can incorporated in the composting process by introduction in the compost producer's initial blend of compostable material, up to about 7% by mass of that material. The biochar can be added in the same or similar manner as any other material would be added or introduced. Blending in biochar at relatively early stages of compost manufacture is preferred. However, in the context of the invention, there is no particular requirement for any such limitation; blending in biochar at relatively later stages would also be workable, and is within the scope and spirit of the invention.

As further described herein, biochar can include a charcoal, or a carbon produced by pyrolysis of biomass (such as meeting or similar to standards for biochar by the International Biochar Initiative, or the European Biochar Certificate issued by the European Biochar Foundation), or as otherwise described with respect to terms and phrases defined herein.

In one embodiment, for each 100 cubic yards of biologically active compost to be produced, about 95 cubic yards of commodity compost are blended with about 2.9 cubic yards of biochar. In such cases, the commodity compost preferably comprises organic material; however, in the context of the invention, those skilled in the art will recognize, after reading this Application, that there is no particular requirement for any such limitation. For example, proportions of biochar between about 0.1% to about 20% by mass would be workable; proportions between about 3% to about 5% by dry mass are preferred.

At a step 112, after completing the thermophilic process, the commodity compost should generally be returned to below a selected temperature, such as about 122 degrees Fahrenheit (alternatively, about 50 degrees Celsius), or as otherwise specified by law or regulation for "compostable" or "thermophilic" conditions. As further described herein, 122 degrees Fahrenheit is a temperature above which thermophilic composting occurs, at least according to legal standards established by USDA (the United States Department of Agriculture), and generally recognized in the industry.

As part of this step, the commodity compost, and all materials introduced therein after the previous step 111 is completed, should be allowed to exceed the legal or regulatory limit for the thermophilic process, as further described herein. In one embodiment, further biological processes performed as part of the method 100 should allow a margin for error, such as by being restricted to a maximum temperature of about 115 degrees Fahrenheit. In one embodiment, moisture should be maintained between about 40% and about 50% by mass of the biomass.

At a step 113, such as when biochar has not been added as part of the earlier step 111 during the thermophilic process, biochar can be (optionally) added, either in lieu of or in addition to addition in the earlier step 121. In such cases, biochar can be added after the thermophilic process is completed. As further described herein, in one embodiment, for each 100 cubic yards of biologically active compost to be produced, about 95 cubic yards of commodity compost are blended with enough biochar to total about 2.9 cubic yards of biochar. As further described herein, in such cases, proportions of total biochar between about 0.1% to about 20% by mass would be workable; proportions of total biochar between about 3% to about 5% by dry mass are preferred.

As part of this step, post-thermophilic in-blending of biochar can be performed using a compost turner, such as the "Mighty Mike" compost turner or a similar device, coupled to a WR-200 tank (which holds 200 gallons) or a similar device. Alternatively, a 500-gallon "water buffalo" type tank, or a similar device, coupled to hoses, can be used to hydrate the material. In one embodiment, water having a pH of 7.0 is added during blending to maintain the material at about 50% moisture by mass of the biomass, such as when measured as further described herein.

As part of this step, with addition of biochar after the thermophilic process is finished, the material should still rise in temperature to about 120 degrees Fahrenheit, and remain at that temperature for about seven to about ten days. The material should be cooled to not more than about this temperature, or alternatively not more than 121 degrees Fahrenheit, until the temperature falls to below 120 degrees Fahrenheit (or a similar temperature). For example, the material can be cooled by blending using the compost turner while restoring the moisture to about 50%. In such cases the coolest regions of the material should be close to surfaces thereof; turning is preferably performed so as to move hotter portions of the material to the surfaces, where they can cool.

At a step 114, performed in parallel or in sequence with the previous step 113, the material's temperature is measured so as to determine whether the temperature has stabilized. For example, when the temperature is not more than about 92 degrees Fahrenheit at places at least 18 inches below the surface, and appears to be declining in response to at least three or more measurements in 24 hours, cooling can be determined to be substantially finished.

The method can proceed with the next flow point.

Compost Material Testing

A flow point 120 indicates that the method 100 is ready to test the compost material for enhancement.

At a step 121, the material is screened for particles greater than about one-half inch in diameter, if this has not already been done by the compost manufacturer. Oversized particles can be reserved for later batches to be manufactured with respect to the flow point 110 above.

At a step 122, the material's pH is measured. In one embodiment, pH between about 8.5 to about 9.0 is preferable; however, in the context of the invention, there is no particular requirement for any such limitation. For example, any pH above about 7.0 is reasonably acceptable. As further described herein, pH can be adjusted at a later flow point, so particular pH requirements are not critical.

At a step 123, the material's temperature is measured. As further described herein, the temperature is preferably not more than about 92 degrees Fahrenheit; however, in the context of the invention, there is no particular requirement for any such limitation. For example, somewhat higher temperatures can be compensated for with respect to a later flow point.

At a step 124, a microscopic inspection is performed of at least about ten samples for each 100 cubic yards of material, to confirm biological sterility after the thermophilic process has finished. As further described herein, "biological sterility" with respect to this step includes cases in which many or most pathogenic organisms (such as preferably a majority thereof) have been killed by the thermophilic process. In one embodiment, a many or most non-pathogens (such as preferably a majority thereof) will have survived the thermophilic process; however, in the context of the invention, there is no particular requirement for any such limitation. For example, in such cases, there might be more than 100 surviving non-pathogenic species, but it is possible that as few as one non-pathogenic species survives.

In one embodiment, performing the steps associated with respect to the flow point 120 can take between about seven to about ten days and about 3% of the material by mass can be consumed by biological activity; however, in the context of the invention, there is no particular requirement for any such limitation. For example, substantial variation of these time and mass values, such as by as much as 100%, would be workable, and is within the scope and spirit of the invention.

A resultant of the steps with respect to the flow point 120 is sometimes referred to herein as an "intermediate compost", as that phrase is further defined herein with respect to "Terms and Phrases".

The method can proceed with the next flow point.

Adding Inoculants I

A flow point 130 indicates that the method 100 is ready to add inoculants to the intermediate compost.

At a step 131, a fungal culture (Product 1 as described above) can be blended into the intermediate compost, such as using a compost turner (such as a compost turner as further described herein). The fungal culture can be any of the products described herein as Product 1. In one embodiment, about 2 cubic yards of fungal culture type "A", 1 cubic yard of fungal culture type "B", 1 cubic yard of fungal culture type "C", and 1 cubic yard of fungal culture type "D", are added to the intermediate compost.

As part of this step, the quantities of fungal culture and their types can be varied in response to the desired ratio of fungal biomass to bacterial biomass in the robust compost to be produced. The amounts described above are in response to a desired ratio of about 1:1. To achieve different ratios (such as a ratio of 1:2 or 0.5:1, a ratio of 4:1, or another ratio), different amounts of fungal culture can be added to the intermediate compost. While this Application primarily describes these particular amounts, in the context of the invention, there is no particular requirement for any such limitation. However, use of at least 0.25 cubic yard of each type of fungal culture, with a total of at least 2 cubic yards, is generally preferred, as is use of up to about 20 cubic yards total.

At a step 132, sprouted, malted barley can be blended into the intermediate compost.

At a step 133, biomethanation materials (Product 2 as described above), minerals (Product 3 as described above), and organic materials (Product 4 as described above), can be blended into the intermediate compost. In one embodiment, Product 2, Product 3, and Product 4, can be blended together, and then added as a group to the intermediate compost.

For example, about 0.5 cubic yards, or alternatively up to about 2 cubic yards, of material from a waste stream of the biomethanation materials, can be used. To this can be added the Product 3 and the Product 4. If the resultant appears more fungal than desired, spent grains (such as from a beer brewery, distillery, or alfalfa) that have been soaked in unchlorinated filtered water for between about 12 and about 24 hours (preferably 18 hours) can be added to encourage bacterial reproduction.

At a step 134, the resultant of the previous step can be blended with one pass of a compost turner. Alternatively, blending can be performed by mixing with water and spraying agitated liquid onto the intermediate compost while turning using the compost turner.

The method can proceed with the next flow point. In one embodiment, the next flow point can be performed the next morning.

Recursive Use of Robust Compost

A flow point 140 indicates that the method 100 is ready to add a portion of a previous batch of robust compost to the intermediate compost.

At a step 141, as further described herein, the portion of the previous batch of robust compost can be disbursed from earlier-manufactured robust compost. Alternatively, the previous batch of robust compost can be manufactured as described with respect to Product 5 (robust compost), such as manufactured with respect to the "soil food web" technique.

As further described herein, the "soil food web" technique is generally limited in the amount that can be manufactured at once, to no more than about 10 cubic yards thereof. Accordingly, when it is desired to manufacture relatively large amounts of robust compost, use of the "soil food web" technique can generally be used only to manufacture a starting amount of robust compost. Thereafter, larger amounts of the robust compost can be manufactured in a continuous process, with each amount of robust compost that is manufactured providing for a portion to be disbursed to further manufacture additional robust compost.

For example, when the "soil food web" technique provides an initial amount of 10 cubic yards of robust compost, the method described herein can provide about 100 cubic yards of robust compost. Thereafter, some fraction (such as about 50 cubic yards) of the robust compost can be disbursed in 5 lots of about 10 cubic yards each, and the method performed in parallel, or at staggered times, to provide about 500 cubic yards of robust compost. When so manufacturing robust compost and disbursing portions thereof, the amount of robust compost that can be manufactured can be increased exponentially with each performance of the method.

As further described herein, when the method is performed at staggered times, with portions of the robust compost disbursed from each of those staggered times, robust compost can be manufactured and provided on a substantially continuous basis. For example, when the method is performed with portions of the robust compost disbursed at staggered times of about 2 weeks apart, disbursement of new batches of robust compost would be available for disbursement at substantially any time with a delay of no more than about 2 weeks.

At a step 142, before blending, all robust compost and all "soil food web" compost can be tested to confirm that no discernable levels of *E. coli* or other pathogens are present.

At a step 143, the robust compost disbursed from earlier-manufactured robust compost can be blended into the intermediate compost.

At a step 144, in one embodiment, robust compost manufactured using the "soil food web" technique can also be blended into the intermediate compost.

In one embodiment, between about 5 cubic yards and about 35 cubic yards (preferably about 8 cubic yards) of disbursed earlier robust compost and new "soil food web" compost can be blended into the intermediate compost.

As part of this step, any solid material on-hand as a resultant from manufacturing compost tea can also be blended into the intermediate compost.

As part of this step, between about 2 cubic yards and about 25 cubic yards (preferably about 5 cubic yards) of Product 5 and Product 6 can be blended into the intermediate compost. In one embodiment, the material can be blended once using a compost turner.

At a step 145, moisture readings are determined, and any water needed to increase moisture to about 50% can be added during the blending process.

As part of this step, moisture and temperature readings can be measured about twice per day. Modestly rising temperatures from bacterial reproduction are expected. Observations and microscopy reviews can be performed at least each two days.

As part of this step, as moisture of the intermediate compost declines to about 40% (for example, just above 40%) one or more of the following sub-steps can be performed:

At a sub-step 145a, if the material needs more fungal material, compost tea from Product 1 (fungal culture) (part D) can be added. Generally, these products should be used within about 90 minutes of completion of aeration and agitation with air bubbles. The compost tea can be used to drench the top and sides of the pile until about 50% moisture is reached.

At a sub-step 145b, if the material needs more bacteria population, compost tea from Product 5 (robust compost, or alternatively, robust compost from a "soil food web" culture), or can be added. Generally, these products should be used within about 90 minutes of completion of aeration and agitation with air bubbles. The compost tea can be used to drench the top and sides of the pile until about 50% moisture is reached.

At a sub-step 145c, if the material needs more bacteria population, compost tea from Product 6 (indigenous microorganisms), or Product 8, can be added. Generally, these products should be used within about 90 minutes of completion of aeration and agitation with air bubbles. The compost tea can be used to drench the top and sides of the pile until about 50% moisture is reached.

As part of this step, when the pH is between about 6.8 and about 7.2, the material can be tested for chemistry and heavy metals.

In one embodiment, the compost tea brewer can produce between about 500 gallons and about 1,000 gallons of liquid. For example, the method 100 can use a 1,150-gallon compost tea brewer from Synergy AgPro, circulating water using a 13.5 gallon/minute diaphragm pump, and aerating the water using a 64.37 cfm/1,833 LPM air pump.

In one embodiment, all of the compost teas should preferably be used within about 90 minutes of aeration and agitation with air bubbles. Each of the compost teas can be used to drench the top and sides of the pile until about 50% moisture is reached.

The sub-steps 145a, 145b, and 145c, are generally determined to be complete when fungal material meets the desired level and bacterial biomass is about 125% of the desired level, in response to a ratio of fungal biomass to targeted biomass. In one embodiment, sufficient fungal biomass can be between about 250 micrograms to about 3,000 micrograms (of beneficial fungi per gram of compost). Also, in one embodiment, average fungal hyphae can exceed 2.5 microns.

As part of this step, if the temperature exceeds 115 degrees Fahrenheit, the compost should be turned, such as using a compost turner. Alternatively, any odors indicating anaerobic activity usually signal excess water (such as inhibiting oxygen) or excess silt or small particles (also such as inhibiting oxygen) or more than 100 ciliates per gram (such as excess moisture). If such a problem persists, the compost turner should be turned.

The intermediate compost is preferably turned whenever there is doubt whether or not to turn it. Generally, each time the compost turner is turned, fungal growth might be slowed, which can delay manufacturing, but should not change the final product. However, turning can have a negative impact on nematode and protozoa life and reproduction within the pile. Also, turning can disturb the fungal hyphae, so it is preferable to minimize turns after achieving an even distribution of fungal strains. Alternatively, "hot spots" can be turned without turning the entire pile.

At a step 146, before the last blending turn, mycorrihizal fungi spores can be added. Generally, these spores should not become active until in the presence of living plants. While just about any brand of mycorrihizal fungi would be workable, and are within the scope and spirit of the invention, in one embodiment, about 25 pounds of "Myco Apply Endo/Ecto" (or another brand having substantially similar properties) per 100 cubic yards of intermediate compost can be used. Other desirable mycorrihizal fungi species can include one or more of: *Glomus intraradices, Glomus mosseae, Glomus aggregatum, Glomus etunicatum, Rhizopogon villosulus, Rhizopogon luteolus, Rhizopogon amylopogon,* *Rhizopogon fulvigleba, Pisolithus tinctorius, Scleroderma cepa,* or *Scleroderma citrinum*.

At a step 147, after blending is complete, modestly rising temperatures from bacterial reproduction are expected. Observations and microscopy reviews can be performed at least each two days.

At a step 148, microscopy can be performed to confirm that no spirilla, spriochetes or streptococci chains, *E. coli*, or oomycete, are present.

The method can proceed with the next flow point.

Adding Inoculants II

A flow point 150 indicates that the method 100 is ready to add further inoculants to the intermediate compost.

At a step 151, the Product 9 (protozoa wash) can be added to the pile. The protozoa wash can be used to drench the top and sides of the pile to bring a moisture level to about 50%. Modest pressure can be used to infuse the liquid into one or more center sections of the pile, such as using an irrigation pipe.

At a step 152, the Product 10 (protozoa tea) can be added to the pile. Similar to the step 151, the protozoa tea can be used to drench the top and sides of the pile to bring a moisture level to about 50%. Modest pressure can be used to infuse the liquid into one or more center sections of the pile, such as using an irrigation pipe.

In one embodiment, the steps 151 and 152 can be repeated until the moisture level declines to about 40%. For example, the steps 151 and 152 can be repeated twice.

At a step 153, the moisture level is maintained between about 40% and about 50% while the compost pile cures. For example, the moisture level can be maintained by performing one or more of the steps 145 and following.

At a step 154, the Product 11 (nematodes), and any Alternative Products, can be added to the compost pile. When the compost pile is ready, it can be disbursed as robust compost.

The method can proceed with the next flow point.

End of Method

A flow point 100B indicates that the method 100 is ready to finish. The method 100 finishes operations and cleans up after any ongoing operations.

In one embodiment, the method 100 can be restarted as triggered by any technique described with respect to the flow point 100A.

Alternative Embodiments

Although this Application primarily describes one set of preferred techniques for using sensors to detect markers and to invoking and performing functions in response thereto, in the context of the invention, there is no particular requirement for any such limitation. Other techniques for using sensors, detecting markers, and invoking and performing functions, and related matters, would also be workable, and are within the scope and spirit of this description. After reading this Application, those skilled in the art would be able to incorporate such other techniques with the techniques shown herein.

The invention claimed is:

1. A method of making a robust compost, including steps of
   (a) performing thermophilic composting to provide a first compost;
   (b) recursively combining the first compost with a robust compost, the robust compost having been produced by the method, said steps of recursively combining including using at least a portion of a product of the method to further provide additional product of the method;

(c) adding a set of inoculants to a result of the steps of (b) recursively combining the first compost with a robust compost;

(d) allowing the combination of the first compost, the robust compost, and the set of inoculants to grow into a microbiome having a collection of microfauna with a biological diversity;

(e) adding biochar in conjunction with performing thermophilic composting;

(f) turning and maintaining the combination of the first compost and the robust compost at 50% moisture for 7 to 10 days; and (g) adding a plurality of species of nematodes to the combination of the first compost and the robust compost, at least one of which is disposed to consume bacteria, at least one of which is disposed to consume fungi, and at least two of which are disposed to be entomopathogenic, wherein none of the plurality of species feed on plant roots;

(h) repeating the steps (a)-(g) using, in the steps (b), a selected portion of the resulting robust compost, wherein the robust compost includes one or more of: at least about 250 micrograms of bacterial biomass per gram of biologically active compost, at least about 250 micrograms of fungi per gram of biologically active compost, at least about 10,000 actively moving protozoa per gram of biologically active compost, or at least about 100 nematodes per gram of biologically active compost.

2. A method as in claim 1, wherein
the set of inoculants includes one or more of:
protozoa wash, protozoa tea, or nematodes.

3. A method as in claim 1, including steps of
adding a second set of inoculants before the steps of
(b) recursively combining the first compost with a robust compost;
the second set of inoculants includes one or more of:
fungal cultures including one or more of: cultures using the oyster mushroom family, cultures using the family Strophariaceae, or cultures using the species *Trametes versicolor,*
minerals including minerals that contain one or more of: feldspar, mineral humic acid, or minerals obtained from earthworm castings,
organic materials including one or more of: grains, alfalfa meal, fish meal, blood meal, powdered oyster shell, crab meal, fish bones, extract or material from succulents, fruit pulp, fruit juice, fruit peels, pomace, spent coffee grounds, used tea leaves, used yerba mata, molasses, jaggery, sugar, wood fines, shredded wood, or wood chips, not to exceed about 0.50 inches in diameter,
or biomethanation materials including digestates.

4. A method as in claim 3, wherein
the fungal cultures have a selected ratio of fungal biomass to bacterial biomass, the selected ratio of fungal biomass to bacterial biomass is between about 1:2 and about 4:1.

5. A method as in claim 4, including the steps of
adding spent grain to the compost to maintain the selected ratio of fungal biomass to bacterial biomass.

6. A method as in claim 1, including steps of
confirming that a result of the steps of
(a) performing thermophilic composting
include one or more of the properties:
having only particles less than about one-half inch in diameter;
having a pH between about 7.0 and about 9.0;
having a temperature less than about 92 degrees Fahrenheit;
being at least more biologically sterile.

7. A method as in claim 1, including steps of
confirming that a result of the steps of
(b) recursively combining the first compost with a robust compost
include one or more of the properties:
having only particles less than about one-half inch in diameter;
having a pH between about 7.0 and about 9.0;
having a temperature less than about 92 degrees Fahrenheit.

8. A method as in claim 1, wherein
the steps of (b) recursively combining the first compost with a robust compost include steps of
dispersing an amount of robust compost of more than about 100 cubic yards of robust compost;
in parallel, combining a portion of the dispersed robust compost with selected ones of a set of distinct thermophilic composts.

9. A method as in claim 1, including steps of
dispersing a result of the microbiome having a collection of microfauna with a biological diversity on a continuous basis,
while performing the steps of (b) recursively combining the first compost with a robust compost.

10. A method as in claim 1, including steps of
adding organisms capable of growing into a microbiome having a collection of microfauna with a wide biological diversity,
to post-thermophilic compost,
in amount exceeding about 100 cubic yards.

11. A method as in claim 1, wherein
the steps of recursively combining the commodity compost with a robust compost include steps of
dispersing an amount of robust compost of more than about 100 cubic yards of robust compost;
such that said dispersal is performed in a staggered manner, combining a portion of the dispersed robust compost with separate portions of a set of distinct thermophilic composts at separate times such that the production of robust compost is maintained at a nearly-constant rate.

12. A method as in claim 1, wherein the robust compost has one or more of the following properties:
the at least about 250 micrograms of bacterial biomass per gram of biologically active compost include a minimum biodiversity of about 150 independent species of bacteria;
the at least about 250 micrograms of fungi per gram of biologically active compost include a minimum biodiversity of about 150 independent species of fungi;
the at least about 10,000 actively moving protozoa per gram of biologically active compost include a minimum biodiversity of about 25 independent species of protozoa;
the at least about 100 nematodes per gram of biologically active compost include a minimum biodiversity of about 5 independent species of nematodes.

* * * * *